C. E. SEARCH.
DRAWBAR.
APPLICATION FILED APR. 18, 1917.
1,385,721. Patented July 26, 1921.
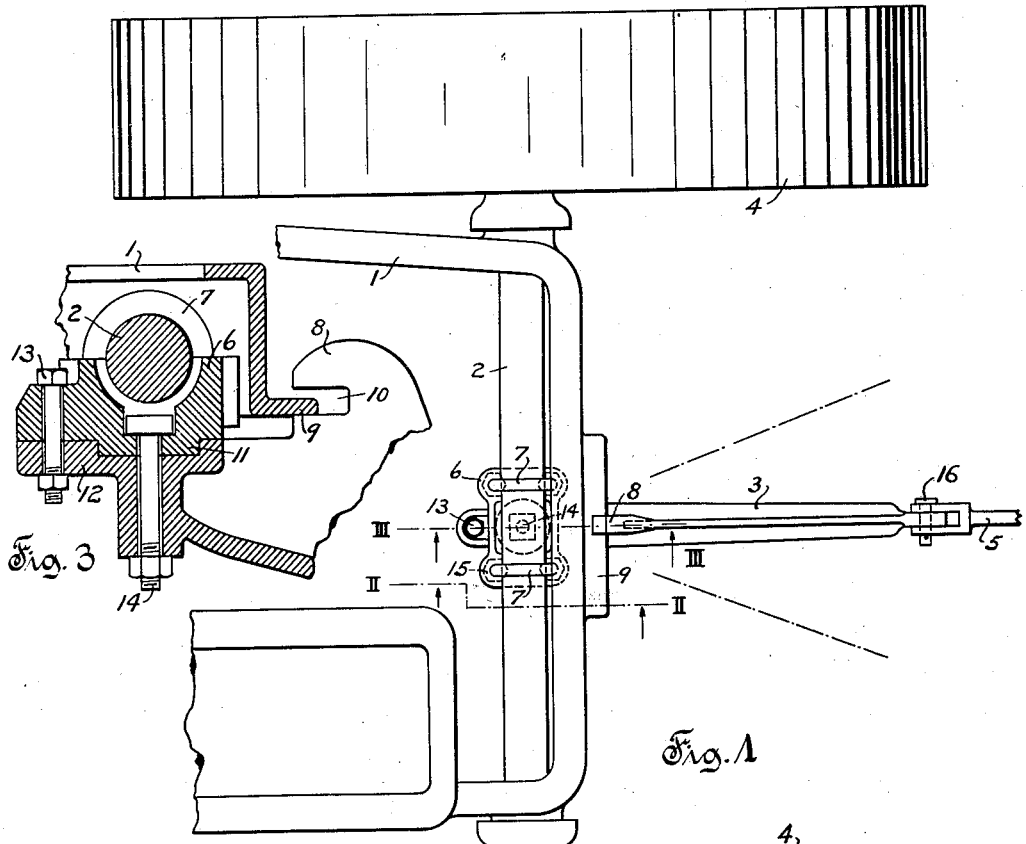
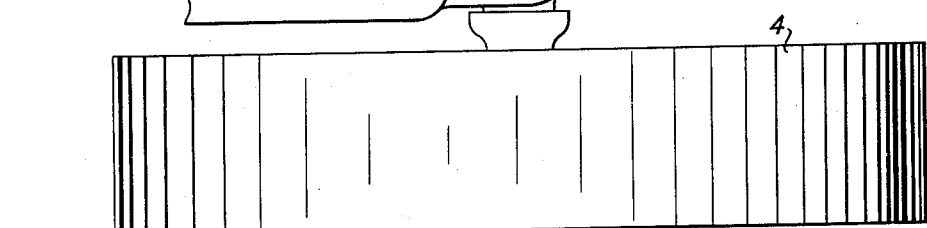
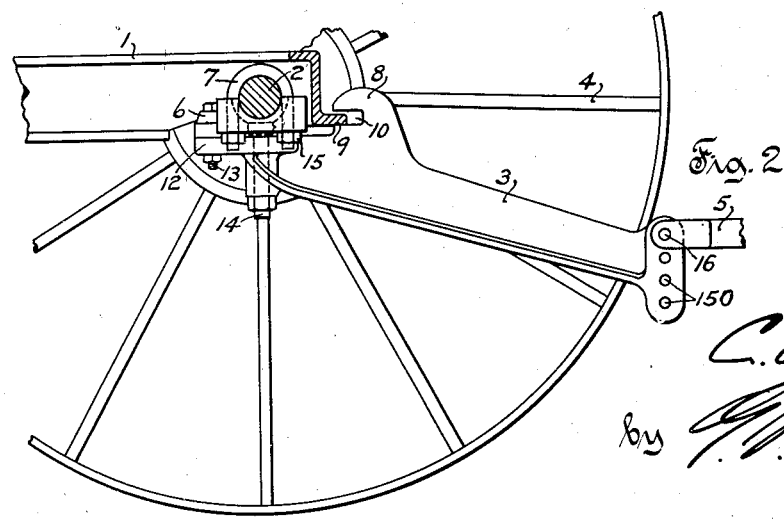

UNITED STATES PATENT OFFICE.

CHARLES EDWIN SEARCH, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

DRAWBAR.

1,385,721.  Specification of Letters Patent.  Patented July 26, 1921.

Application filed April 18, 1917. Serial No. 163,305.

*To all whom it may concern:*

Be it known that I, CHARLES EDWIN SEARCH, a citizen of the United States, residing at Milwaukee, in the county of Milwaukee and State of Wisconsin, have invented a certain new and useful Improvement in Drawbars, of which the following is a specification.

This invention relates to improvements in the construction of draw-bars for tractors and is especially applicable to tractors for agricultural uses.

An object of the invention is to provide a draw-bar which is simple in construction and efficient in operation. Another object is to provide means for adjusting the position of the draw-bar relatively to the vehicle body, in order to secure most efficient distribution of the draft. A further object is to provide a simple and efficient connection between the vehicle and the draw-bar. Still another object is to provide means for connecting implements of various types to a tractor and to maintain the relative positions of the connected parts such as to produce most efficient operation of the implement.

A clear conception of an embodiment of the invention may be had by referring to the drawing accompanying and forming a part of this specification, in which like reference characters designate the same or similar parts in the several views.

Figure 1 is a top view of a draw-bar showing the same applied to a fragment of a vehicle.

Fig. 2 is a side elevation of a draw-bar showing the same applied to a fragment of a vehicle, a vertical section through which has been taken along the line II—II of Fig. 1 looking in the direction of the arrows.

Fig. 3 is an enlarged fragmentary vertical section through the draw-bar and the adjacent portions of the vehicle, the section being taken along the line III—III of Fig. 1, looking in the direction of the arrows.

In the form of the invention disclosed, the draw-bar 3 is preferably formed of cast metal such as steel and is suspended from the axle 2 of the vehicle by means of U bolts 7, an intermediate bearing block 6 and a pivotal connecting bolt 14. The axle 2 is mounted in bearings in the vehicle frame 1 in the usual manner, and has wheels 4 mounted on the overhanging ends thereof. The frame 1 is provided at its trailing end, with a rectilineal flange or projection 9 which normally fits into a recess 10 formed in an upwardly extending projection 8 of the draw-bar 3. The draw-bar 3 at its leading extremity is provided with a portion 12 which is bored to fit a cylindrical projection 11 of the bearing block 6. The block 6 is adjustable along the axle 2 within the limits of the frame 1, and may be clamped in any adjusted position by means of the nuts 15 engaging the extremities of the U bolts 7. The draw-bar 3 may be locked in mid position by means of a locking bolt 13 which may be passed through alinable openings in the block 6 and portion 12 of the draw-bar 3. The trailing end of the draw-bar 3 is provided with a vertical series of openings 150 arranged at different distances from the ground. The implement to be drawn is provided with a draw-bar element 5 adapted to be attached to the trailing end of the draw-bar 3 by means of a bolt 16, passed through one of the openings 150.

It will be noted that with the locking bolt 13 removed, the draw-bar 3 is free to swing about the projection 11 and bolt 14 as a pivot, within the limits defined by the frame 1 as indicated in the dot and dash lines in Fig. 1. The connection between the draw-bar and the axle 2 may be shifted along the axle 2 to any point which is found to produce most efficient distribution of the draft, and this connection may be then locked in position by means of the nuts 15. This feature is desirable when the number of implements such as plows, which it is desired to pull, is to be varied, or in case it is desired to have the implement drawn in a predetermined position relative to the wheel treads. As it is ordinarily desirable to have the pull substantially in line with the draw-bar 3, this result may be secured by connecting the element 5 to the proper hole 150 of the series. Vertical displacement of the draw-bar relatively to the frame 1, in both upward and downward directions is prevented by means of the frame projection 9 which engages the side walls of the recess 10 in the draw-bar projection 8. The flange or projection 9 thus serves to prevent excessive vertical movement of the draw-bar 3.

It should be understood that it is not desired to limit the invention to the exact details of construction herein shown and described, for obvious modifications within the scope of the appended claims may occur to a person skilled in the art.

It is claimed and desired to secure by Letters Patent:

1. In combination, suspension means comprising a frame having an elongated horizontal flange and a cylindrical element extending parallel to said flange, and a draw-bar embracing said cylindrical element and adjustably attachable thereto at different portions of its length, said draw-bar having a portion extending in close proximity above and below said flange and said flange serving to prevent vertical displacement of said draw-bar about said element.

2. In combination, suspension means comprising a frame having an elongated rectilineal horizontal flange and a cylindrical element extending parallel to and located forwardly of said flange, and a draw-bar having its forward end embracing said cylindrical element and adjustably attachable thereto at different portions of its length, said draw-bar having a medial portion extending in close proximity above and below said flange and said flange serving to prevent vertical displacement of said draw-bar about said element.

3. In combination, suspension means comprising a frame having an elongated horizontal flange and a cylindrical element extending parallel to said flange, a draw-bar having a portion embracing said cylindrical element and adjustably attachable thereto at different portions of its length, said draw-bar having another portion extending in close proximity above and below said flange and said flange serving to prevent vertical displacement of said draw-bar around said element, and a pivot for said draw-bar located adjacent to said element for permitting displacement of said draw-bar along said flange.

4. In combination, suspension means comprising a frame having an elongated horizontal flange and a cylindrical element extending parallel to said flange, a draw-bar having a portion embracing said cylindrical element and adjustably attachable thereto at different portions of its length, said draw-bar having another portion extending in close proximity above and below said flange and said flange serving to prevent vertical displacement of said draw-bar around said element, a pivot for said draw-bar located adjacent to said element for permitting displacement of said draw-bar along said flange, and means for locking said draw-bar against angular displacement about said pivot.

In testimony whereof, the signature of the inventor is affixed hereto.

CHARLES EDWIN SEARCH.